United States Patent
Ando (10) Patent No.: US 12,208,523 B2
(45) Date of Patent: Jan. 28, 2025

(54) ROBOT SYSTEM AND CONTROL METHOD (71) Applicant: FANUC CORPORATION, Yamanashi (JP)

(72) Inventor: Toshiyuki Ando, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 203 days.

(21) Appl. No.: 18/040,997

(22) PCT Filed: Sep. 10, 2021

(86) PCT No.: PCT/JP2021/033227
§ 371 (c)(1),
(2) Date: Feb. 8, 2023

(87) PCT Pub. No.: WO2022/059600
PCT Pub. Date: Mar. 24, 2022

(65) Prior Publication Data
US 2023/0302634 A1 Sep. 28, 2023

(30) Foreign Application Priority Data

Sep. 15, 2020 (JP) .................... 2020-154681

(51) Int. Cl.
B25J 9/16 (2006.01)

(52) U.S. Cl.
CPC .............. *B25J 9/163* (2013.01); *B25J 9/1664* (2013.01); *B25J 9/1697* (2013.01)

(58) Field of Classification Search
None
See application file for complete search history.

(56) References Cited

U.S. PATENT DOCUMENTS

| 2017/0120449 | A1* | 5/2017 | Matsunami | B25J 9/1676 |
|---|---|---|---|---|
| 2018/0297204 | A1* | 10/2018 | Krasny | B25J 9/163 |
| 2019/0091868 | A1* | 3/2019 | Taira | B25J 9/1669 |
| 2020/0331143 | A1* | 10/2020 | Wang | B25J 9/1664 |
| 2023/0046827 | A1* | 2/2023 | Yoneyama | B25J 9/1656 |

FOREIGN PATENT DOCUMENTS

| JP | H08057372 A | 3/1996 |
|---|---|---|
| JP | H08324755 A | 12/1996 |
| JP | 2000153482 A | 6/2000 |

(Continued)

*Primary Examiner* — Ryan Rink
(74) *Attorney, Agent, or Firm* — Maier & Maier, PLLC (57) ABSTRACT A robot system including an articulated robot equipped with a tool attached to a distal-end wrist axis, a sensor that detects a position and an orientation of the workpiece, and a controller configured to control the robot based on an operation program. The operation program includes two or more teaching points, each of which defines a position and an orientation of the tool, and an operation instruction. The controller is configured to correct the position and the orientation of the tool at a first teaching point based on the detected position and the orientation, determine whether an angle of the distal-end wrist axis at the first teaching point after correction exceeds an operating limit, and when it is determined that the operating limit is exceeded, change the angle, at the first teaching point, to an angle to be within the operating range by increasing or decreasing the angle.

4 Claims, 7 Drawing Sheets (56) References Cited

FOREIGN PATENT DOCUMENTS

| | | |
|---|---|---|
| JP | 2005149216 A | 6/2005 |
| JP | 2006048244 A | 2/2006 |
| JP | 2009056513 A | 3/2009 |
| JP | 2010058202 A | 3/2010 |
| JP | 2010253668 A | 11/2010 |
| JP | 2018187751 A | 11/2018 |
| JP | 2019058979 A | 4/2019 |

* cited by examiner

```
1 : JOINT   POSITION [1 : UNLOADING POSITION]  100%
2 : ;
3 : START PICKING ;
4 : LINEAR  POSITION [2 : APPROACH POSITION] 100 mm/s
5 : LINEAR  POSITION [3 : PICKING POSITION] 100 mm/s
6 : LINEAR  POSITION [2 : APPROACH POSITION] 100 mm/s
7 : END PICKING ;
```

ROBOT SYSTEM AND CONTROL METHOD

TECHNICAL FIELD

The present disclosure relates to a robot system and a control method.

BACKGROUND

There is a known robot system in which a picking operation and a phase matching operation are repeated for a plurality of workpieces (for example, see Japanese Unexamined Patent Application, Publication No. 2019-58979). In this robot system, when the picking operation is performed without rotating a wrist, the rotation angle of the wrist approaches a stroke limit; therefore, the wrist is rotated in a direction in which the rotation angle thereof approaches 0° at a timing at which the distance between workpieces is large.

An aspect of the present disclosure is a robot system including: an articulated robot equipped with a tool which performs work on a workpiece, the tool being attached to a distal-end wrist axis having an operating range of 360° or more; a sensor that detects a position and an orientation of the workpiece; and a controller configured to control the robot based on an operation program, wherein the operation program includes two or more teaching points each of which defines a position and an orientation of the tool, and an operation instruction for moving each joint, between the teaching points, in a direction in which a rotation amount thereof is minimized, and wherein the controller is configured to: correct the position and the orientation of the tool at a first teaching point where work is to be performed on the workpiece based on the position and the orientation of the workpiece detected by the sensor; determine whether or not an angle of the distal-end wrist axis at the first teaching point, which is calculated based on the position and orientation of the tool after correction, exceeds an operating limit; and when it is determined that the operating limit is exceeded, change the angle of the distal-end wrist axis, at each of the first teaching point and one or more of other teaching points adjacent to the first teaching point, to an angle to be within the operating range by increasing or decreasing the angle by 360°.

DETAILED DESCRIPTION OF THE EMBODIMENTS

In a case in which a robot is linearly moved among three or more teaching points, the robot is continuously moved in a direction in which the rotation amount of each shaft of the robot becomes small. In this case, for example, when an attempt is made to correct the orientation of the robot at any one of the teaching points in accordance with the orientation of a workpiece to be handled, the angle of a distal-end wrist axis exceeds an operating limit and this could cause an error stop.

Because the operating range of the distal-end wrist axis is generally set to 360° or more, in the case in which the operating limit is exceeded, it is possible to avoid the error stop if the angle is corrected to an angle that differs therefrom by 360°. However, in this case, it is necessary to rotate the distal-end wrist axis by a large amount corresponding to an angle of approximately 360°.

When the rotating operation in a large angle range is performed in an operating section in which the distance between teaching points is small or in an operating section in which the robot is in close proximity to a peripheral member such as a workpiece, a tool, such as a hand, that is attached to the wrist rotates rapidly or interferes with the peripheral member in some cases.

Therefore, it is desirable to avoid an error stop caused by the angle of a distal-end wrist axis after correction exceeding an operating limit, while avoiding rapid rotation of a tool, such as a hand, and interference thereof with a peripheral member.

A robot system 1 and a control method according to an embodiment of the present disclosure will be described below with reference to the drawings.

Figure 1:
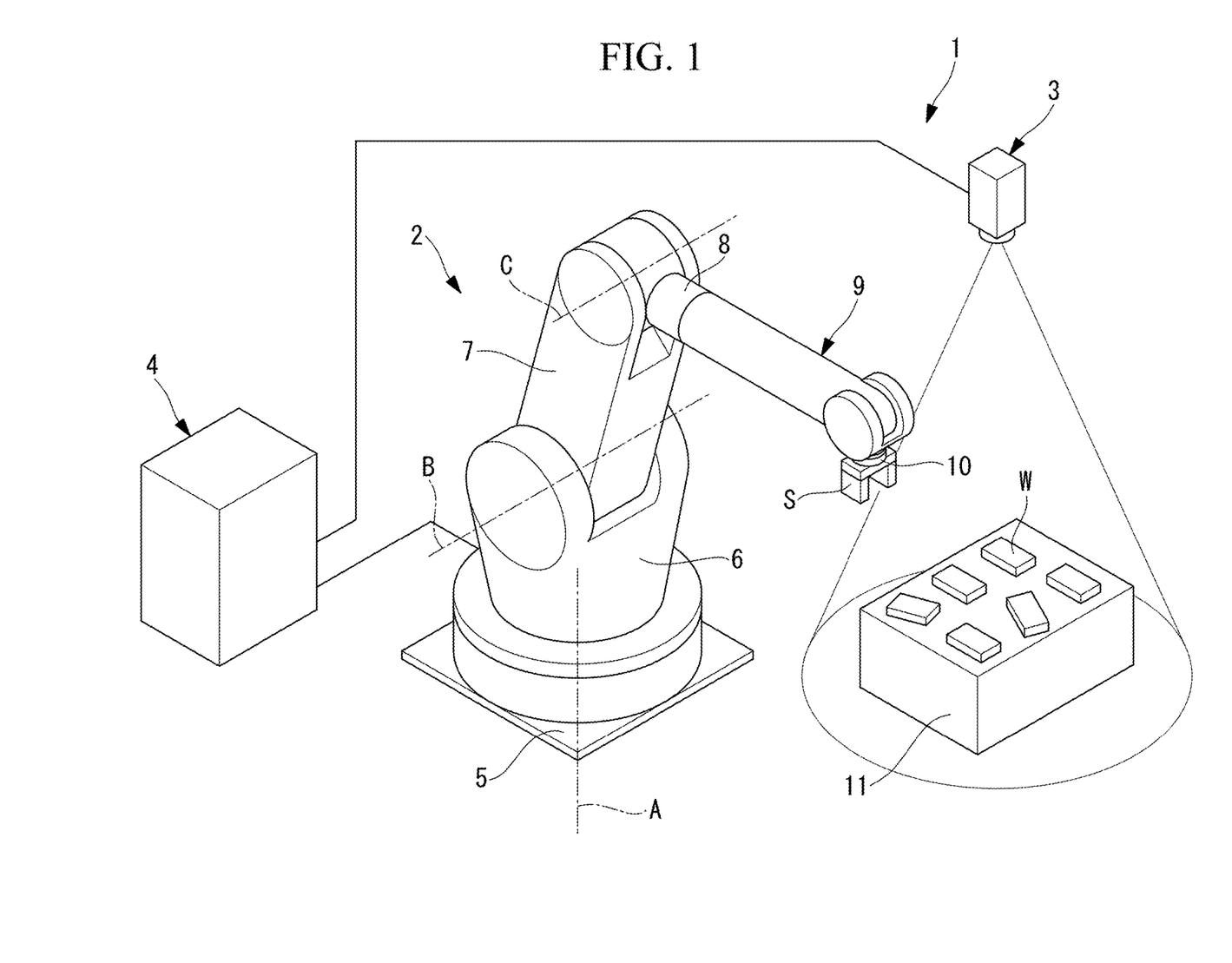
FIG. 1 is a perspective view showing a robot system according to an embodiment of the present disclosure.

As shown in FIG. 1, the robot system 1 according to this embodiment includes: a robot 2; a camera (sensor) 3 that detects a position and orientation of a workpiece W to be handled by the robot 2; and a controller 4 that controls the robot 2.

The robot 2 is, for example, a vertical six-axis articulated robot and includes: a base 5 that is installed on a floor; a revolving drum 6 that is rotatable with respect to the base 5 about a first axis A extending in the vertical direction; and a first arm 7 that is rotatable with respect to the revolving drum 6 about a horizontal second axis B. In addition, the robot 2 includes a second arm 8 that is rotatable with respect to the first arm 7 about a third axis C parallel to the second axis B, and a three-axis wrist unit 9 that is attached to the distal end of the second arm 8.

A distal-end wrist axis 10 of the wrist unit 9 has an operating range of 360° or more, for example, an operating range from −200° to +200°. A hand (tool) S for gripping the workpiece W is attached to the distal-end wrist axis 10, and a point at which the workpiece W is gripped by the hand S is set as a tool center point. The tool center point has tool coordinates that are set with the tool center point as the origin and that are fixed to the hand S.

The camera 3 is disposed, facing downward, above the workpiece W placed on a table 11, and is capable of detecting the position and orientation of the workpiece W by capturing an image of the workpiece W. The information about the detected position and orientation of the workpiece W is transmitted to the controller 4.

The controller 4 includes at least one processor and a memory.

The controller 4 stores an operation program taught in advance and controls the robot 2 according to the operation program.

Figure 2:
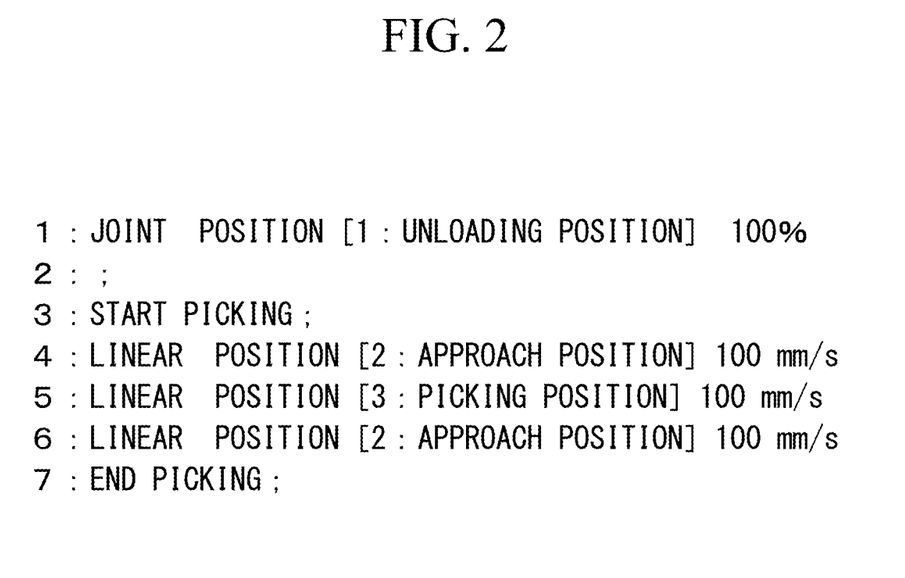
FIG. 2 is a diagram showing an example of an operation program stored in a controller of the robot system in FIG. 1.

FIG. 2 shows an example of the operation program.

In the figure, "Each joint Position [1]" is an operation instruction for moving the robot 2 from the current position to position [1] by means of the operation of each axis thereof. Here, position [1] is an unloading position P1 of the workpiece W. In addition, "100%" represents the operating speed of each axis.

In addition, position [2] and position [3] that are set as destinations in the fourth line to the sixth line enclosed with "Start picking:" and "End picking:" are selected as positions where processing in this embodiment is performed. Position [2] is an approach position (second teaching point) P2 of the hand S with respect to the workpiece W, and position [3] is a picking position (first teaching point) P3 at which the workpiece W is gripped.

Figure 3:
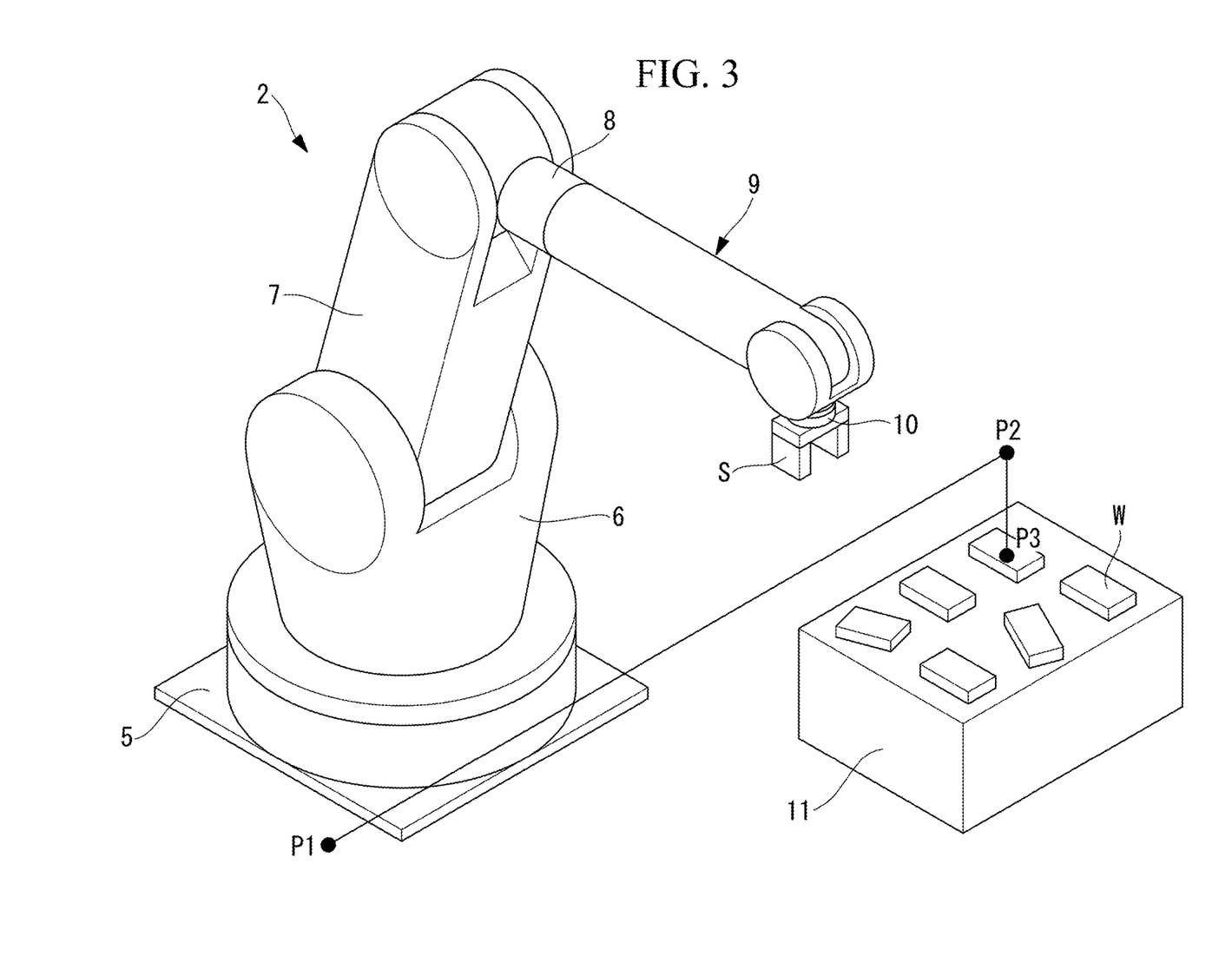
FIG. 3 is a perspective view showing an example of three teaching points set in the operation program in FIG. 2.

In the figure, "Linear" is a linear motion instruction for linearly moving the tool center point. The linear motion instruction causes each joint to move in a direction in which the rotation amount of each joint is minimized, in a motion path between the current position and a target teaching point. In FIG. 3, movement to the approach position P2 and the picking position P3 is the operation for linearly moving the tool center point. "100 mm/s" is a speed along the linear motion direction.

As shown in FIG. 3, the approach position P2 is disposed at a position that is moved vertically upward, with respect to the picking position P3, by a distance greater than the height of the workpiece W. The unloading position P1 is disposed at, for example, a position that is sufficiently separated from the approach position P2 and the picking position P3 in a horizontal direction.

With this configuration, it is possible to move the hand S from the unloading position P1 to the approach position P2 where the hand S is brought close to the workpiece W without interfering with the workpiece W, thereby achieving a preparation state for gripping the workpiece W.

In addition, the hand S that has gripped the workpiece W at the picking position P3 is moved to the approach position P2 again, instead of being directly moved to the unloading position P1. By doing so, it is possible to confirm the state of the workpiece W gripped by the hand S at a position where the workpiece W is slightly lifted from the table 11.

In addition, when the position and orientation of a workpiece W to be gripped next are detected by the camera 3, the controller 4 corrects the position and orientation of the tool coordinates at the approach position P2 and the picking position P3 on the basis of the detected position and orientation.

Figure 4:
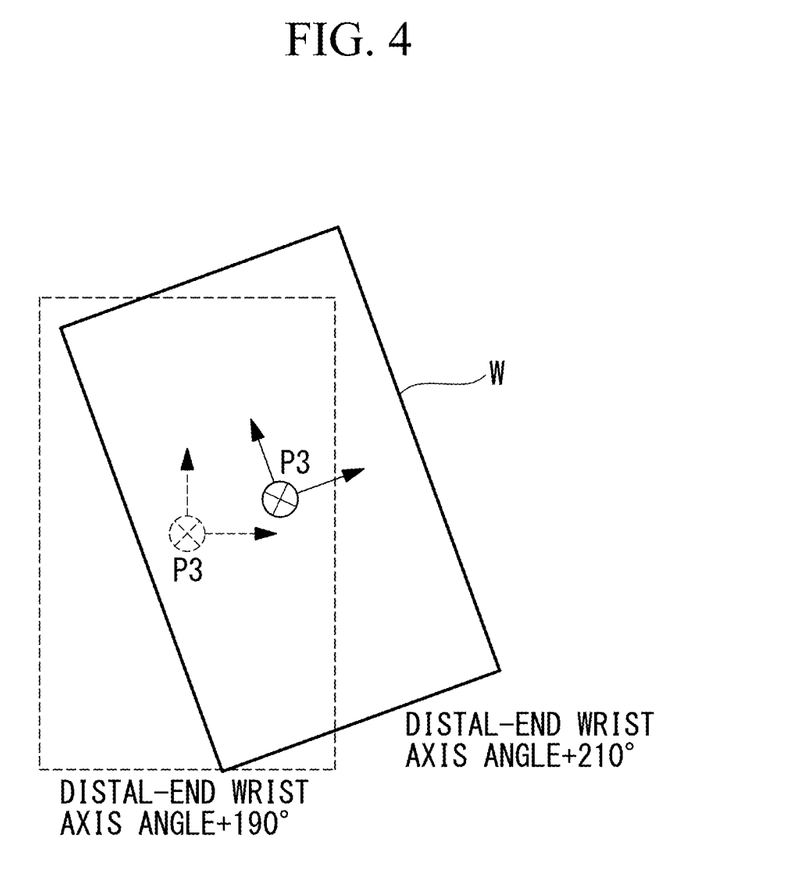
FIG. 4 is a diagram for explaining an example of a difference in position and orientation between a workpiece that is taught in the operation program of the robot system in FIG. 2 and a workpiece that is captured by a camera.

Specifically, for the picking position P3, the position and orientation of the tool coordinates for gripping the workpiece W defined in the operation program, which is indicated by a broken line in FIG. 4, are corrected on the basis of the position and orientation of the workpiece W, which is indicated by a solid line, detected by the camera 3. In addition, for the approach position P2, the position and orientation of the tool coordinates are corrected so as to maintain the relative relationship with the picking position P3 before correction, which is defined in the operation program.

In this case, as a result of the correction of the position of the tool coordinates and orientation at the picking position P3, the rotation angle of each joint of the robot 2, which is calculated from the position and orientation of the tool coordinates after correction, may exceed the operating range in some cases.

Figure 5:
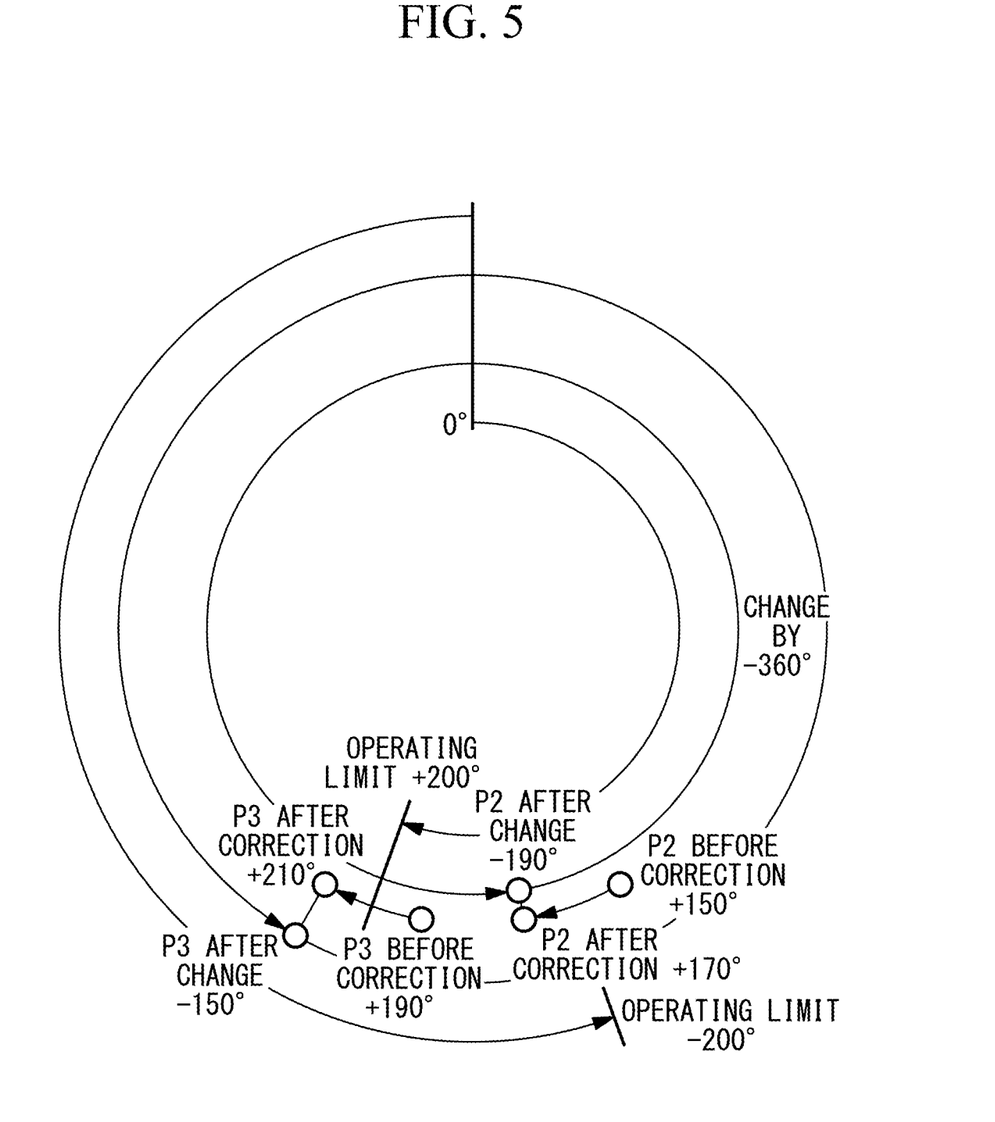
FIG. 5 is a diagram for explaining an example of a process of changing a picking position P3 and an approach position P2 that are set in the operation program in FIG. 2.

Specifically, as shown in FIG. 5, the case in which the angle of the distal-end wrist axis 10 at the approach position P2 in the operation program is +150°, and the angle of the distal-end wrist axis 10 at the picking position P3 in the operation program is +190° will be illustrated as an example.

In addition, it is assumed that the angle of the distal-end wrist axis 10 at the picking position P3 after correction, which is obtained on the basis of the position and orientation of the workpiece W detected by the camera 3, is +210°. For the approach position P2, the angle of the distal-end wrist axis 10 is corrected to +170° so as to maintain, even after correction, the relative relationship with the picking position P3 before correction.

In this case, in this embodiment, the controller 4 performs the following processing for the approach position P2 and the picking position P3 that are selected in the operation program.

In other words, it is determined whether or not the angle +210° of the distal-end wrist axis 10 after correction exceeds +200°, which is the operating limit, and when the operating limit is exceeded, the angle of the distal-end wrist axis 10 is changed to −150°, which differs by −360° from +210° and is within the operating range.

Furthermore, although the angle of the distal-end wrist axis 10 at the approach position P2 after correction is +170°, which is within the operating range, said angle is changed to −190°, which differs therefrom by −360°, in order to maintain, even after correction, the relative relationship with the picking position P3 before correction.

Next, a control method for the robot 2 in the thus-configured robot system 1 according to this embodiment will be described below.

Figure 6:
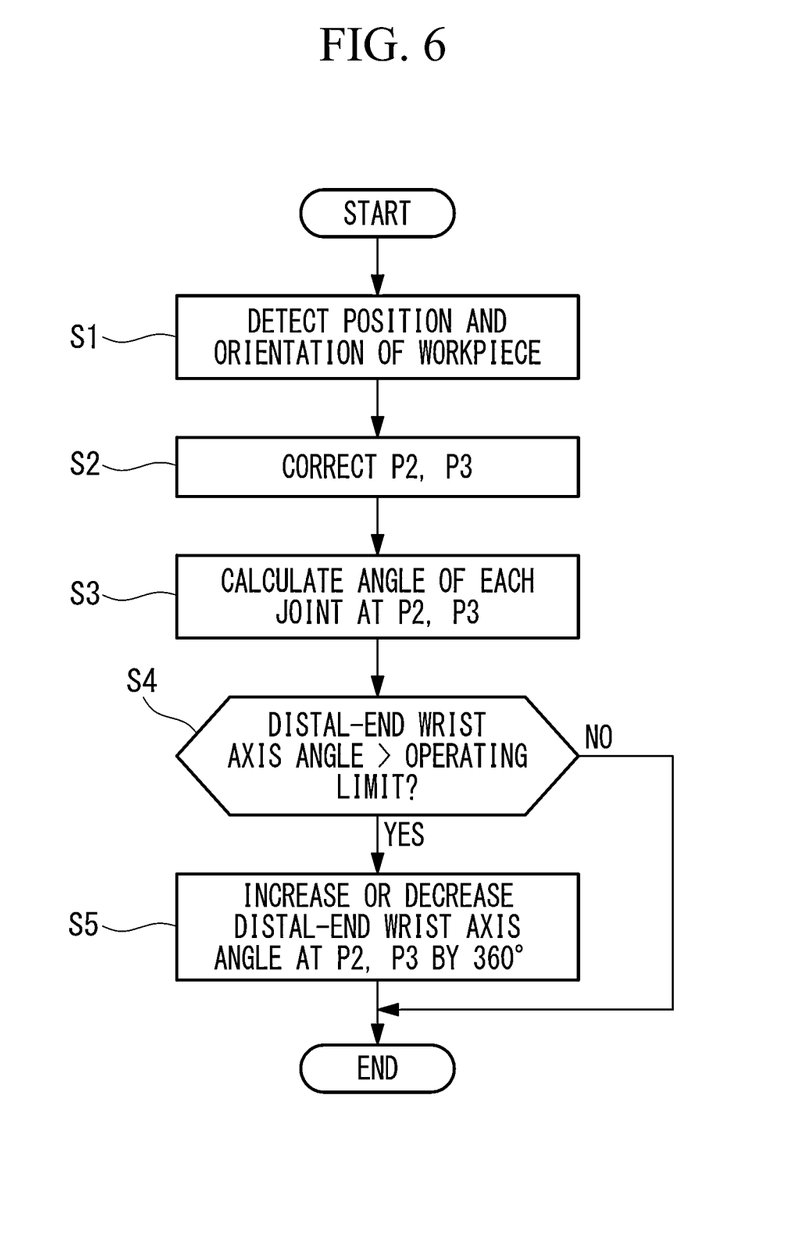
FIG. 6 is a flowchart for explaining a control method according to an embodiment of the present disclosure.

In the control method according to this embodiment, as shown in FIG. 6, first, the position and orientation of the workpiece W are detected by the camera 3 (step S1), and the position and orientation of the tool coordinates at the picking position P3 and the approach position P2 are corrected on the basis of the detected position and orientation (step S2).

Then, the angle of each joint at the picking position P3 and the approach position P2 is calculated on the basis of the position and orientation of the tool coordinates after correction (step S3), and it is determined whether or not the angle of the distal-end wrist axis 10 exceeds the operating limit (step S4).

Furthermore, in the control method according to this embodiment, when it is determined that the operating limit is exceeded, the angle of the distal-end wrist axis 10 at the picking position P3 and the approach position P2 is changed to an angle that differs therefrom by 360° (step S5).

With the thus-configured robot system 1 and control method according to this embodiment, in the case in which the angle of the distal-end wrist axis 10 at the picking position P3 exceeds the operating limit as a result of the correction based on the detection result by the camera 3, said angle is changed to an angle that differs therefrom by 360°. By doing so, the angle of the distal-end wrist axis 10 is set within the operating range, and thus, it is possible to prevent an error stop due to the operating limit being exceeded.

Figure 7:
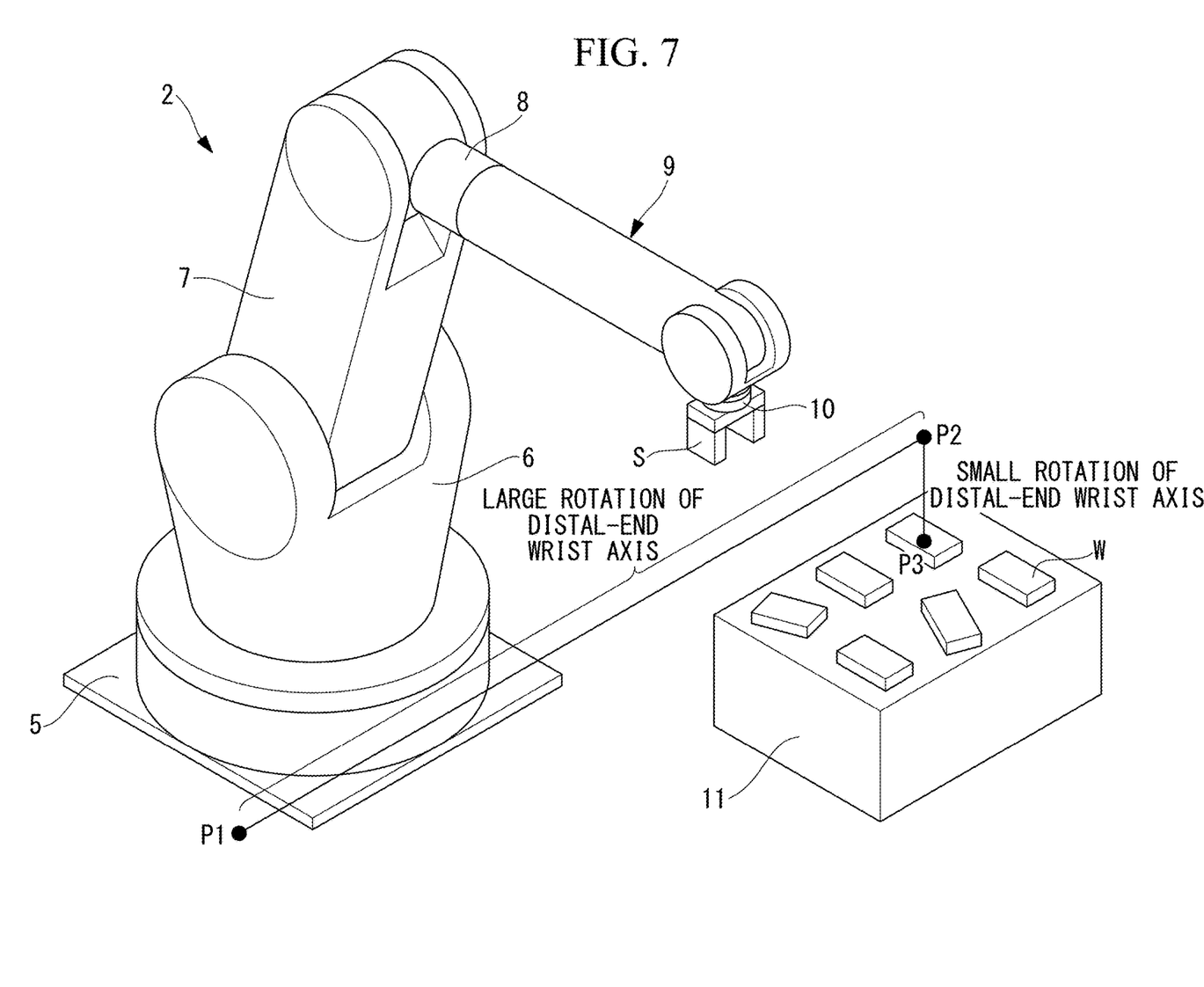
FIG. 7 is a perspective view for explaining the effect of the robot system in FIG. 1 and the control method in FIG. 6.

In this case, in this embodiment, the angle of the distal-end wrist axis 10 is changed to an angle that differs therefrom by 360° not only for the picking position P3 where the operating limit is exceeded due to the correction but also for the approach position P2 where the operating limit is not exceeded. By doing so, as shown in FIG. 7, the hand S is not rotated by a large amount between the picking position P3 and the approach position P2 where the hand S is brought close to the workpiece W; therefore, there is an advantage in that it is possible to prevent the hand S from interfering with the workpiece W or a peripheral object. In the related art, the operating range of the distal-end wrist axis 10 was checked so that the angle thereof fell within the operating range only for a next target position of the robot 2. Therefore, there was a problem in that, for example, the distal-end wrist axis 10 was rotated by 360° during movement from the approach position P2 to the picking position P3, thus causing the hand S to interfere with a peripheral object or to fail to grip the workpiece W. This problem can be avoided with the robot system 1 and the control method according to this embodiment.

Meanwhile, the angle of the distal-end wrist axis 10 is not changed by 360° for the unloading position P1 that is not selected in the operation program; thus, the distal-end wrist axis 10 is rotated by a large amount during movement from the unloading position P1 to the approach position P2. Because the unloading position P1 is disposed at a position that is sufficiently separated from the approach position P2, even when the hand S is rotated by a large amount in the path to the approach position P2, the hand S does not interfere with the workpiece W or a peripheral object.

Note that, in this embodiment, the processing for increasing or decreasing the angle of the distal-end wrist axis 10, which has exceeded the operating limit due to the correction, by 360° is performed for all teaching points selected by enclosing with "Start picking:" and "End picking:" in the operation program. Alternatively, a subprogram may be defined in the operation program and the abovementioned processing may be performed only for all teaching points in the subprogram, or an additional instruction may be set for each operation instruction (for example, "Linear Position [2] 100 mm/s Picking"). In addition, it suffices that the robot operation instructions indicate application of the present invention, and the description method therefor is not limited to the method described in this embodiment.

In addition, in this embodiment, the abovementioned processing is performed for the picking position P3, which is a single first teaching point where the hand S performs work on the workpiece W, and the approach position P2, which is a single second teaching point adjacent to the first teaching point. Alternatively, the abovementioned processing may be performed for a plurality of first teaching points and a plurality of second teaching points.

The invention claimed is:

1. A robot system, comprising:
    an articulated robot equipped with a tool that performs work on a workpiece, the tool attached to a distal-end wrist axis having an operating range of 360° or more;
    a sensor that detects a position and an orientation of the workpiece; and
    a controller configured to control the robot based on an operation program,
    wherein the operation program includes two or more teaching points, each of which defines a position and an orientation of the tool, and an operation instruction for moving each joint, between the teaching points, in a direction in which a rotation amount thereof is minimized,
    wherein the controller is configured to:
    correct the position and the orientation of the tool at a first teaching point where work is to be performed on the workpiece based on the position and the orientation of the workpiece detected by the sensor;
    determine whether or not an angle of the distal-end wrist axis at the first teaching point, which is calculated based on the position and orientation of the tool after correction, exceeds an operating limit; and
    when it is determined that the operating limit is exceeded, change the angle of the distal-end wrist axis, at each of the first teaching point and one or more of other teaching points adjacent to the first teaching point, to an angle to be within the operating range by increasing or decreasing the angle by 360°.

2. The robot system according to claim 1, wherein
    the first teaching point and one or more second teaching points adjacent to the first teaching point are selected in the operation program, and
    the controller increases or decreases the angle of the distal-end wrist axis by 360°, at each of the selected first teaching point and the second teaching points.

3. A control method for controlling an articulated robot equipped with a tool that performs work on a workpiece, the tool attached to a distal-end wrist axis having an operating range of 360° or more, based on an operation program, in a robot system including the robot and a sensor that detects a position and an orientation of the workpiece,
    wherein the operation program includes a plurality of teaching points each of defines a position and an orientation of the tool, and an operation instruction for moving each joint, between the teaching points, in a direction in which a rotation amount thereof is minimized,
    the control method comprising:
    correcting the position and the orientation of the tool at a first teaching point where work is to be performed on the workpiece based on the position and orientation of the workpiece detected by the sensor;
    determining whether or not an angle of the distal-end wrist axis at the first teaching point, which is calculated based on the position and orientation of the tool after correction, exceeds an operating limit; and
    when it is determined that the operating limit is exceeded, changing the angle of the distal-end wrist axis, at each of the first teaching point and one or more of other teaching points adjacent to the first teaching point, to an angle to be within the operating range by increasing or decreasing the angle by 360°.

4. The control method according to claim 3, wherein changing the angle of the distal-end wrist axis, at each of the first teaching point and the one or more of the other teaching points adjacent to the first teaching point, to an angle to be within the operating range by increasing or decreasing the angle by 360° includes:
    selecting the first teaching point and one or more second teaching points adjacent to the first teaching point in the operation program; and
    increasing or decreasing the angle of the distal-end wrist axis by 360°, at each of the selected first teaching point and the second teaching points.

* * * * *